US012198576B2

(12) United States Patent
Huo et al.

(10) Patent No.: US 12,198,576 B2
(45) Date of Patent: Jan. 14, 2025

(54) DYNAMIC CUE GENERATION FOR LANGUAGE LEARNING

(71) Applicant: INTERNATIONAL BUSINESS MACHINES CORPORATION, Armonk, NY (US)

(72) Inventors: Zhan Peng Huo, Beijing (CN); Jia Yu, Beijing (CN); Jia Tian Zhong, Beijing (CN); Yong Yin, Beijing (CN); Dong Hui Liu, Beijing (CN); Peng Hui Jiang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 46 days.

(21) Appl. No.: 17/653,905

(22) Filed: Mar. 8, 2022

(65) Prior Publication Data
US 2023/0290261 A1    Sep. 14, 2023

(51) Int. Cl.
*G09B 7/04* (2006.01)
*G09B 19/06* (2006.01)

(52) U.S. Cl.
CPC ............... *G09B 7/04* (2013.01); *G09B 19/06* (2013.01)

(58) Field of Classification Search
CPC .................................. G09B 7/04; G09B 19/06
See application file for complete search history.

(56) References Cited

U.S. PATENT DOCUMENTS

| | | |
|---|---|---|
| 2011/0208508 A1 | 8/2011 | Criddle |
| 2017/0186338 A1 | 6/2017 | Treves |
| 2018/0268309 A1 | 9/2018 | Childress |
| 2020/0213650 A1* | 7/2020 | Tillette de Clermont-Tonnerre .......... H04N 21/44218 |

FOREIGN PATENT DOCUMENTS

WO    2014168949 A1    10/2014

OTHER PUBLICATIONS

"Liulishuo's AI App Is Teaching English to 70 Million People," Apr. 26, 2018, 8 pages, Synced. <https://syncedreview.com/2018/04/25/liulishuos-ai-app-is-teaching-english-to-70-million-people/>.
Chrysafiadi et al., "Combination of fuzzy and cognitive theories for adaptive e-assessment," Expert Systems with Applications, 2020, 24 pages, Elsevier Ltd.
Mell et al., "The NIST Definition of Cloud Computing," Recommendations of the National Institute of Standards and Technology, U.S. Department of Commerce, Special Publication 800-145, Sep. 2011, 7 pgs.

(Continued)

*Primary Examiner* — Robert J Utama
(74) *Attorney, Agent, or Firm* — Yee & Associates, P.C.

(57) ABSTRACT

A method, system, and computer program product for dynamic cue generation for language learning are provided. The method identifies one or more listener actions for a listener engaged in listening learning. Based on the one or more listener actions, a language level of the listener is determined. A set of prompt metrics are generated based on the language level and the one or more listener actions. A set of audio stream levels is generated based on the set of prompt metrics. The method selects an audio stream level for a listening prompt, where the audio stream level is selected from the set of audio stream levels based on the language level of the listener.

20 Claims, 6 Drawing Sheets

(56) References Cited

OTHER PUBLICATIONS

Rassaei, "Effects of Mobile-Mediated Dynamic and Nondynamic Glosses on L2 Vocabulary Learning: A Sociocultural Perspective," The Modern Language Journal, 2020, 40 pages, Wiley Online Library, Muscat Oman.

Tonguc et al., "Automatic recognition of student emotions from facial expressions during a lecture," Computers & Education, Jan. 7, 2020, 12 pages, Elsevier Ltd.

* cited by examiner

DYNAMIC CUE GENERATION FOR LANGUAGE LEARNING

BACKGROUND

Pressure and desire to learn foreign languages has increased as industries make efforts toward globalization. Language learning increasingly utilizes computing technology, with programs presenting audio and visual language learning opportunities. Computer software that provides language learning functionality takes many forms. However, language learning software generally employs a predetermined lesson format to teach language incrementally. This incremental language learning is generally performed using topically or linguistically related words presented to a language learner with simple prompts and with minimal accent.

SUMMARY

According to an embodiment described herein, a computer-implemented method for dynamic cue generation for language learning is provided. The method identifies one or more listener actions for a listener engaged in listening learning. Based on the one or more listener actions, a language level of the listener is determined. A set of prompt metrics are generated based on the language level and the one or more listener actions. A set of audio stream levels is generated based on the set of prompt metrics. The method selects an audio stream level for a listening prompt, where the audio stream level is selected from the set of audio stream levels based on the language level of the listener.

According to an embodiment described herein, a system for dynamic cue generation for language learning is provided. The system includes one or more processors and a computer-readable storage medium, coupled to the one or more processors, storing program instructions that, when executed by the one or more processors, cause the one or more processors to perform operations. The operations identify one or more listener actions for a listener engaged in listening learning. Based on the one or more listener actions, a language level of the listener is determined. A set of prompt metrics are generated based on the language level and the one or more listener actions. A set of audio stream levels is generated based on the set of prompt metrics. The operations select an audio stream level for a listening prompt, where the audio stream level is selected from the set of audio stream levels based on the language level of the listener.

According to an embodiment described herein, a computer program product for dynamic cue generation for language learning is provided. The computer program product includes a computer-readable storage medium having program instructions embodied therewith, the program instructions being executable by one or more processors to cause the one or more processors to identify one or more listener actions for a listener engaged in listening learning. Based on the one or more listener actions, a language level of the listener is determined. A set of prompt metrics are generated based on the language level and the one or more listener actions. A set of audio stream levels is generated based on the set of prompt metrics. The computer program product selects an audio stream level for a listening prompt, where the audio stream level is selected from the set of audio stream levels based on the language level of the listener.

DETAILED DESCRIPTION

Figure 1:
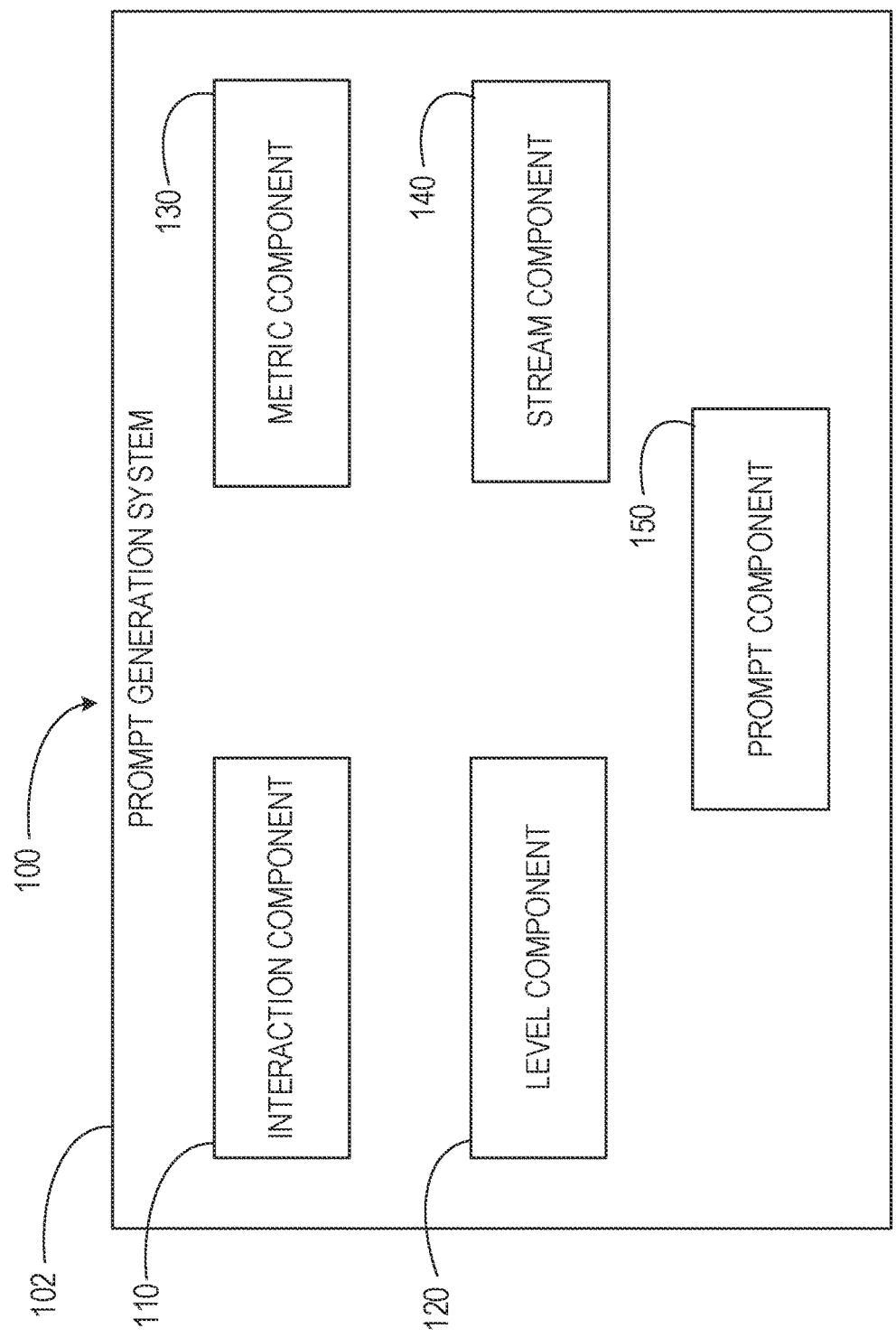
FIG. 1 depicts a block diagram of a computing environment for implementing concepts and computer-based methods, according to at least one embodiment.

The present disclosure relates generally to methods for language learning. More particularly, but not exclusively, embodiments of the present disclosure relate to a computer-implemented method for dynamic cue generation to promote language learning and language fluency. The present disclosure relates further to a related system for language learning, and a computer program product for operating such a system.

When language learners encounter unfamiliar words, phrases, or accents in prerecorded material, the learner often rewinds the relevant section for repeated listening. Depending on speed, presentation style, and content organization, the language learner may occupy significant time in searching for locations within a recording to identify relevant sections for repeated listening. In instances of recordings of a technical or professional nature which, language learners may require increased review due to the words included in that subject matter being infrequently used in conversation or language learning classes and software.

Current language learning software often achieve training objectives for language learners by utilizing preestablished lessons. The preestablished lessons may group words, phrases, and concepts. The preestablished lessons may present words in an audio/visual format in sequence using simple word prompts. The audio is often presented in a clear and monotone manner without a native or regional accent. These preestablished lessons generally focus on conversational words and concepts, leaving many useful or specialized subjects untrained. Further, language learners often find preestablished lessons to be tedious, reducing the student's willingness or desire to learn.

Embodiments of the present disclosure enable dynamic generation of cues to aid in language learning across a variety of subject matter. Methods and systems of the present disclosure analyzes user interactions and behaviors during audio or audio/visual presentations to determine language levels and listening levels for a user. The present disclosure describes concepts that enable dynamic prompt or cue generation for a user based on user interactions, behaviors, language levels, or listening levels. Embodiments of the present disclosure enable dynamic generation of prompts or cues as a language learner is listening to an audio or an audio/visual presentation. Embodiments of the present disclosure enable generation of prompts and cues based on a dynamic determination of a language listener's level of knowledge of and demonstrated aptitude with the language, listening to the language, and a subject matter being presented within a presentation. Embodiments of the present disclosure may dynamically generate prompts or cues for a language listener based on the listener's interactions or behavior relating to a presentation or portions of a presentation, thus saving time and effort in reviewing the presentation to find unfamiliar or unclear language or concepts within the presentation. Embodiments of the present disclosure enable automatic adjustment of prompts for a user's level according to the user's learning curve. The present disclosure also enables customization of levels of improvement or reduction according to needs of the user.

Some embodiments of the concepts described herein may take the form of a system or a computer program product. For example, a computer program product may store program instructions that, when executed by one or more processors of a computing system, cause the computing system to perform operations described above with respect to the computer-implemented method. By way of further example, the system may comprise components, such as processors and computer-readable storage media. The computer-readable storage media may interact with other components of the system to cause the system to execute program instructions comprising operations of the computer-implemented method, described herein. For the purpose of this description, a computer-usable or computer-readable medium may be any apparatus that may contain means for storing, communicating, propagating, or transporting the program for use, by, or in connection with, the instruction execution system, apparatus, or device.

Referring now to FIG. 1, a block diagram of an example computing environment 100 is shown. The present disclosure may be implemented within the example computing environment 100. In some embodiments, the computing environment 100 may be included within or embodied by a computer system, described below. The computing environment 100 may include a learning prompt generation system 102. The learning prompt generation system 102 may comprise an interaction component 110, a level component 120, a metric component 130, a stream component 140, and a prompt component 150. The interaction component 110 identifies listener actions, interactions, and behaviors while the listener is engaging with a set of content. The level component 120 determines language levels, listening levels, and edge areas for the listener. The metric component 130 generates prompt metrics based on levels determined by the level component 120 and listener actions. The stream component 140 generates audio stream levels based on the set of prompt metrics. The prompt component 150 selects an audio stream level for a listening prompt and generates the listening prompt as an audio stream. Although described with distinct components, it should be understood that, in at least some embodiments, components may be combined or divided, and/or additional components may be added without departing from the scope of the present disclosure.

Figure 2:
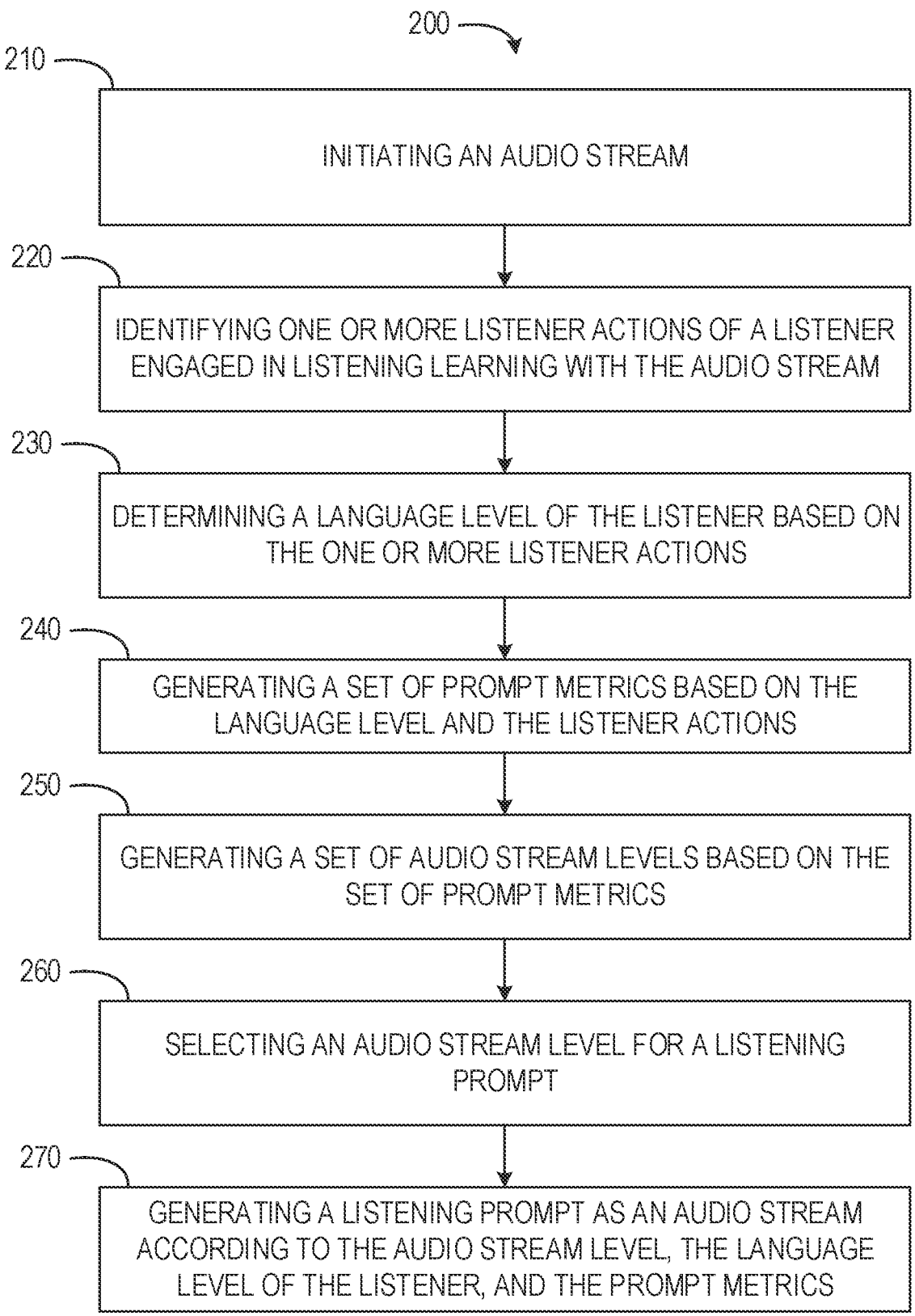
FIG. 2 depicts a flow diagram of a computer-implemented method for dynamic cue generation for language learning, according to at least one embodiment.

Referring now to FIG. 2, a flow diagram of a computer-implemented method 200 is shown. The computer-implemented method 200 is a method for dynamic cue generation for language learning. In some embodiments, the computer-implemented method 200 may be performed by one or more components of the computing environment 100, as described in more detail below.

At operation 210, the stream component 140 initiates an audio stream. The audio stream may be associated with language learning activities. The audio stream may include a specified or selected language. The audio stream may be associated with a language level, an accent, a presentation speed, a vocabulary, a combination thereof, or any other suitable aspects and characteristics. In some embodiments, the audio stream is initiated within a language learning application.

At operation 220, the interaction component 110 identifies one or more listener actions. The listener actions are identified for a listener engaged in listening learning. The one or more listener actions may be detected by the interaction component 110 after initiation of an audio stream with which the listener is engaged for listening learning activities. The listener actions may be detected using an image capture device (e.g., a camera), an input device (e.g., a keyboard or a mouse), an audio capture device (e.g., a microphone), or any other suitable device capable of or configured to providing a signal to the interaction component 110 which is discernable as a listener action.

Listener actions may be identified for segments of an audio stream engaged by the listener. The listener actions may be identified for topic segments, time segments, or any other suitable portions of the audio stream. In some embodiments, the one or more listener actions are identified for each sentence.

The listener actions may be actions, interactions, reactions, or behaviors in which the listener engages while listening to a set of content, such as an audio or audio/visual stream. The listener actions may include user actions (e.g., shaking a head negatively), graphical user interface (GUI) interactions (e.g., cursor movement towards various program controls), expressions (e.g., making a confused-looking face), voice actions (e.g., saying, "what," or making confused noises/vocalizations), or any other receivable, measurable, or discernable actions of the listener.

In some embodiments, listener actions indicate manipulation of a segment of an audio stream, such as a sentence. The manipulation of the segment may be repetition of a segment (e.g., sentence), slowing down the segment, or pausing the segment. The manipulation of the segment may be multiple repetitions or other manipulations of a segment. In some instances, the listener actions indicate complementary action associated with a segment of an audio stream. The complementary action may include changing programs or tabs within a graphical user interface, interacting with an external document while engaging with an audio segment, or performing an internet search while engaging with an audio segment.

In some embodiments, a user (e.g., a listener or learner) of the learning prompt generation system 102 initiates play, playback, listening, or streaming of an audio or audio/visual stream. Upon encountering an unfamiliar word, phrase, accent, sentence pattern, or other difficulty, the user performs an action. The action may be a facial expression, such as frowning or furrowing eyebrows; a body movement, such as raising or waiving of hands; an utterance, such as a grunt, a sigh, a questioning tone, or a voice command; or any other suitable bodily action indicating lack of familiarity with at least a portion of the stream. The action may be replaying an area, portion, or segment of the stream. The action may be pausing the stream, changing a currently viewed user interface (e.g., switching to a web browser to look up a word), or any other suitable action.

Upon identifying the one or more listener or user actions, the interaction component 110 may determine the behavior as a listening event. The listening event and characteristics of the listening event (e.g., type of action, location within the stream, subject matter at the time of the event, and language attributes at the time of the event) may be logged within a knowledge base. In some embodiments, the knowledge base is tailored to the user of the learning prompt generation system 102. In some instances, the knowledge base is a knowledge base for all or a portion of users of the learning prompt generation system 102. Where the knowledge base applies to more than one user, the listening event and characteristics of the listening event may be sanitized to remove any personally identifying information of the user triggering the listening event.

At operation 230, the level component 120 determines a language level of the listener. In some embodiments, the language level is determined based on the one or more listener actions. The level component 120 may determine the language level of the listener based on the one or more listener actions and a predefined level rule. The level component 120 may determine the language level of the listener by calculating a proportion of different levels of factors associated with the audio or audio/visual stream, the listening event, and characteristics of the listening event.

A plurality of factors may affect the language level of the listener. In some instances, factors affecting a language level and an edge area of the language level are new words, phrases, accents, or sentence patterns. The factors may apply to certain concepts, subjects, or situations. Each factor may be classified to different language levels. For example, words may be classified by differing levels of difficulty.

In some instances, the language level is initially set at a level defined by one or more previous sessions of listening learning, a self-reported language level, a predetermined language level, a language level associated with an audio stream with which the listener is engaged, or any other suitable manner. For example, in a previous session, a listener may engage with a previous audio segment. Once a segment has been listened to, the components of the learning prompt generation system 102 may determine if the segment was repeated and whether the segment was previously repeated. Where the segment is not repeated and has not previously been repeated, the components analyze factors present within the segment and establish or increase a language level of the listener. The components may combine level estimations for a plurality of segments in a listening session to establish the language level for the listener. Where the components determine the segment is repeated, the components may decrease one or more language level elements of the listener based on factors contained within the segment and modify a language level of the listener based on the decreased language level elements.

In some instances, the language level is determined based on a number of listener actions in the one or more listener actions. For example, the one or more listener actions may represent a plurality of repetitions of a given sentence or segment of an audio stream. Where a plurality of repetitions are detected, the language level of the listener may be decreased from the initially set language level based on factors contained within the segment, a number of repetitions, and whether a listening session terminates with a completion or repetition of the segment.

In some embodiments, the level component 120 calculates a proportion of different levels of factors found within sentences associated with listener actions. The level component 120 may identify factors on which the listener is focusing. For example, the listener may focus on words in a level Y1, phrases in a level Y2, accents in a level Y3, and sentence patterns in a level Y4. In some embodiments, based on the combined levels Y1, Y2, Y3, and Y4, the level component 120 may determine the language level of the user. Although described in the example above with four levels associated with four different variables or factors, it should be understood that a segment may be associated with levels for any suitable and relevant number of factors or variables contained within the segment.

The level component 120 may determine three regions for sentences engaged by the listener. The three regions may be determined for each sentence by comparing aspects of each sentence with historical information about the language abilities of the listener. The three regions may include a blurred, fuzzy, or edge region; a normal region; and an accurate region.

The edge area may be a fuzzy area defining limits of the user or listener's knowledge of a given language. In some embodiments, the edge or fuzzy area indicates a language area in which the user indicates confusion or lack of understanding and the level component 120 identifies one or more potential reasons for such an indication. The level component 120 may determine the edge region or edge area by comparing one or more factors for the language level to one or more language characteristics of a listening learning segment associated with the one or more listener actions. In some embodiments, the edge region is determined by comparing the one or more factors for the language level to one or more language characteristics and a number of repeated actions or repeated listener actions. In such instances, the level component 120 may use fuzzy logic to relate a number of repeated sentences designated in the fuzzy or edge area that the user does not understand with sentences in the normal region. The level component 120 may determine a cause of user misunderstanding of a segment in the fuzzy area using the fuzzy logic comparison. Once the cause is determined, the level component 120 may move the segment from the fuzzy are to the accurate area.

The edge or fuzzy area may include words, phrases, subject matter, concepts, grammatical rules, vernacular, slang, listening, accent, reading, or other aspects of a language. The edge area may indicate areas or aspects of a language for which the listener or user should improve to increase familiarity and fluency with a language.

The accurate region or accurate area may be determined by comparing the one or more factors for the language level to one or more language characteristics and a singular repetition of a sentence or singular listener action. In some embodiments, the accurate region may represent a segment or language area that the user misunderstood, based on listener actions, and for which the level component 120 has determined a cause of the misunderstanding.

Sentences which are not subject to the one or more listener actions may be placed in the normal region.

Sentences which are repeated by the listener or otherwise subject to the one or more listener actions may be placed in the edge region or the accurate region. For example, sentences which are repeated a single time or subject to a listener action only once, with an identifiable factor causing the misunderstanding, may be placed in an accurate region. Sentences which are repeated multiple times (e.g., three times), subject to multiple listener actions, or repeated without an identified factor causing the misunderstanding may be placed in the edge region. Sentences repeated multiple times, and repeated again, may be added to a blurred region for fuzzy matching to locate a given user's fuzzy or edge region for a specified language, topic, or other related knowledge and to sequentially or iteratively determine one or more factors associated with the misunderstanding. In some embodiments, sentences which are repeated, with emphasized factors, above a specified repetition threshold may be added to the fuzzy or edge region. Emphasized factors may be used to iteratively determine factors causing misunderstanding of a segment of the audio stream.

In some embodiments, the level component 120 determines the language level of the listener by analyzing sentences in a blurred or edge area at predetermined periods of time. The level component 120 counts times each essential or emphasized factor has occurred during the language listening. The level component 120 analyzes sentences from normal regions at predetermined periods of time and counts each time an essential factor occurred. The level component 120 may then perform fuzzy matching to locate a user's weakness based on the analysis of edge area sentences and normal region sentences. The level component 120 may then adjust scores of the essential factors. In some embodiments, the level component 120 also analyzes sentences from the accurate region during specified or predetermined periods of time. The level component 120 may compare the user's weaknesses identified based on the edge areas and normal regions with the essential factors of the accurate regions. The level component 120 may then adjust scores of the essential factors of the accurate region. In some embodiments, based on the adjusted scores of essential factors of the edge areas and normal regions and essential factors of the accurate regions, the level component 120 calculates the user's dynamic scores on the essential factors to determine the language level of the listener or user.

For example, where a single repetition of a given sentence or segment of the audio stream is detected, the level component 120 may determine essential factors for the sentence or segment. The level component 120 may determine the essential factors to increase related language levels of the user based on the user's current or initial language level.

At operation 240, the metric component 130 generates a set of prompt metrics. In some embodiments, the set of prompt metrics are generated based on one or more of the language level and the one or more listener actions. For example, the prompt metrics, and associated values, may be used in multi-player perception and softmax. Factors used for determining the language level of the listener may affect listening ability of the user and be incorporated into the set of prompt metrics.

The set of prompt metrics may be generated to form a score using one or more machine learning methods. The machine learning methods may predict a priority ranking based on a user's language level and a difficulty of the audio stream of the listening learning activity. The machine learning methods may design a multi-classifier and use a confidence score of each category of prompt metrics as a basis of ranking. The machine learning methods may generate a labeled training data set based on historical usage data of the user or a set of users to generate the set of metric prompts. The prompt metrics may be received or generated as an input layer. A hidden layer within the machine learning methods may be generated and linked to the input layer. An output layer may be generated using softmax.

The prompt metrics may include factors contained in listening sentences or segments. In some embodiments, prompt metrics include a number of listening sentences misunderstood due to accent, speed of speech, phrases within the sentences, new words in the sentences, continuous reading, or any other suitable aspect. The prompt metrics may also include a number of replays of a sentence by historical users of a current audio stream due to accent, speech rate, phrases within the sentence, words within the sentence, continuous reading, or other aspects. The prompt metrics may also include a proportion of sentences understood by the user among a set of listening sentences. The prompt metrics may also include a proportion of a number of historical users who understood a given sentences within a set of historical users.

In some embodiments, the metric component 130 uses machine learning to predict a reminder priority ranking. The reminder priority ranking may be predicted based on the listener's language level and a difficulty of an audio segment. The metric component 130 may design a multi-classifier and use confidence scores of each category as a basis of ranking. In such instances, the metric component 130 may generate a multi-layer perceptron network using the multi-classifier and softmax to generate the prompt metrics.

In some embodiments, the metric component 130 generates a labeled training data set based on historical data, such as historical audio segments and historical listener actions associated with audio segments. The labeled training data set may be represented using Equation 1 below.

$$D1=\{(x_1,y_1),(x_2,y_2),(x_3,y_3),\ldots,(x_n,y_n)\} \quad \text{Equation 1}$$

D1 may be a data set. The x and y elements may represent factors discoverable within a set of audio segments and a set of listener actions. Each x and y element may be a value representing a combination of factors. An example x element may be represented as Equation 2 below.

$$x_i=\{u_i^1,u_i^2,u_i^3,u_i^4,u_i^5,u_i^6,t_i^1,t_i^2,t_i^3,t_i^4,t_i^5,t_i^6\} \quad \text{Equation 2}$$

In Equation 2, $u_i^1$ may be a number of times a user i did not understand a first listening sentence due to accent. $U_i^2$ may be a number of times that a user i did not understand the first n listening sentences due to the speed of speech. $U_i^3$ may be a number of times that a user i did not understand a first n listening sentences due to phrases. $U_i^4$ may be a number of times that a user i did not understand a first n listening sentences due to new words. $U_i^5$ may be a number of times that a user i did not understand a first n listening sentences due to continuous reading. $U_i^6$ may be a proportion of sentences understood by a user i among a first n listening sentences. In Equation 2, $t_i^1$ may be a number of replays of a list m historical users of a sentence i of a current listening audio because of accent. $T_i^2$ may be a number of times the last m historical users of a sentence i of a current listening audio played back because of a speech rate. $T_i^3$ may be a number of times a last m historical users of a sentence i of a current listening audio played back because of phrases. $T_i^4$ may be a number of times a last m historical users of a sentence i of a current listening audio played back because of new words. $T_i^5$ may be a number of times a last m historical users of a sentence i of a current listening audio played back because of continuous reading. $T_i^6$ may be a proportion of a number of users who understand a sentence i heard in a last m historical users.

An example y element for Equation 1 may be represented as Equation 3 below.

$$y_i \in \{C_1,C_2,C_3,C_4,C_5,C_6\} \quad \text{Equation 3}$$

In Equation 3, $C_1$ may represent an accent. $C_2$ may represent a speech rate or speed. $C_3$ may represent phrases. $C_4$ may represent new words. $C_5$ may represent continuous reading. $C_6$ may represent understanding. Each time a user engages with the language learning system, the metric component 130 may generate a piece of training data as described above using the three equations or any other suitable and relevant equations or data representations.

At operation 250, the stream component 140 generates a set of audio stream levels. In some embodiments, the set of audio stream levels are generated based on the set of prompt metrics. The set of audio stream levels may be a plurality of audio stream levels. The set of audio stream levels may be generated based on the set of prompt metrics at a language level at, above, or below that of the listener or user. In some embodiments, the set of audio stream levels are generated as language levels at or near the language level of the listener and associated with factors identified within the audio stream associated with the listener actions.

At operation 260, the prompt component 150 selects an audio stream level for a listening prompt. In some embodiments, the audio stream level is selected from the set of audio stream levels based on the language level of the listener. The audio stream level may be selected as a nearest audio stream level to the language level of the listener. In some instances, the audio stream level is selected as a nearest audio stream level to the listening level of the listener. The audio stream level may be selected as an audio stream with a same level as the listening level, a level above the listening level, or a level below the listening level. The audio stream level may be selected based on factors identified within the audio stream associated with the listener actions and emphasized thereby.

At operation 270, the prompt component 150 generates the listening prompt as an audio stream. The listening prompt may be generated according to the audio stream level, the language level of the listener, and the set of prompt metrics. In some embodiments, the listening prompt is generated and presented as part of a listening learning session. In some instances, before the user switches to a subsequent audio stream or listening article, the listening prompt may be triggered if factors for the listening prompt belong to language levels at or near the language level of the listener.

In some embodiments, the listening prompt generated in operation 260 is generated with a selected audio stream level in response to the one or more listener actions at a specified moment in a current audio stream associated with the listening learning activity. The listener action may indicate a confusing portion or moment within the current audio stream. In such instances, the listening prompt may be generated as a repetition of a confusing sentence in a familiar accent. The listening prompt may be generated as a repeated section of audio at a decreased speed. The listening prompt may be generated as a repeated section of audio using different vocabulary or word choice. The listening prompt may be generated as a set of additional information relative to and relevant to the portion or moment of a current audio stream associated with the one or more listener actions.

For example, where a user is listening to a specified listening level, the prompt component 150 may generate a listening prompt at an audio stream level one difficulty level above or below the current listening level before the user switches to a next portion of the audio stream.

Figure 3:
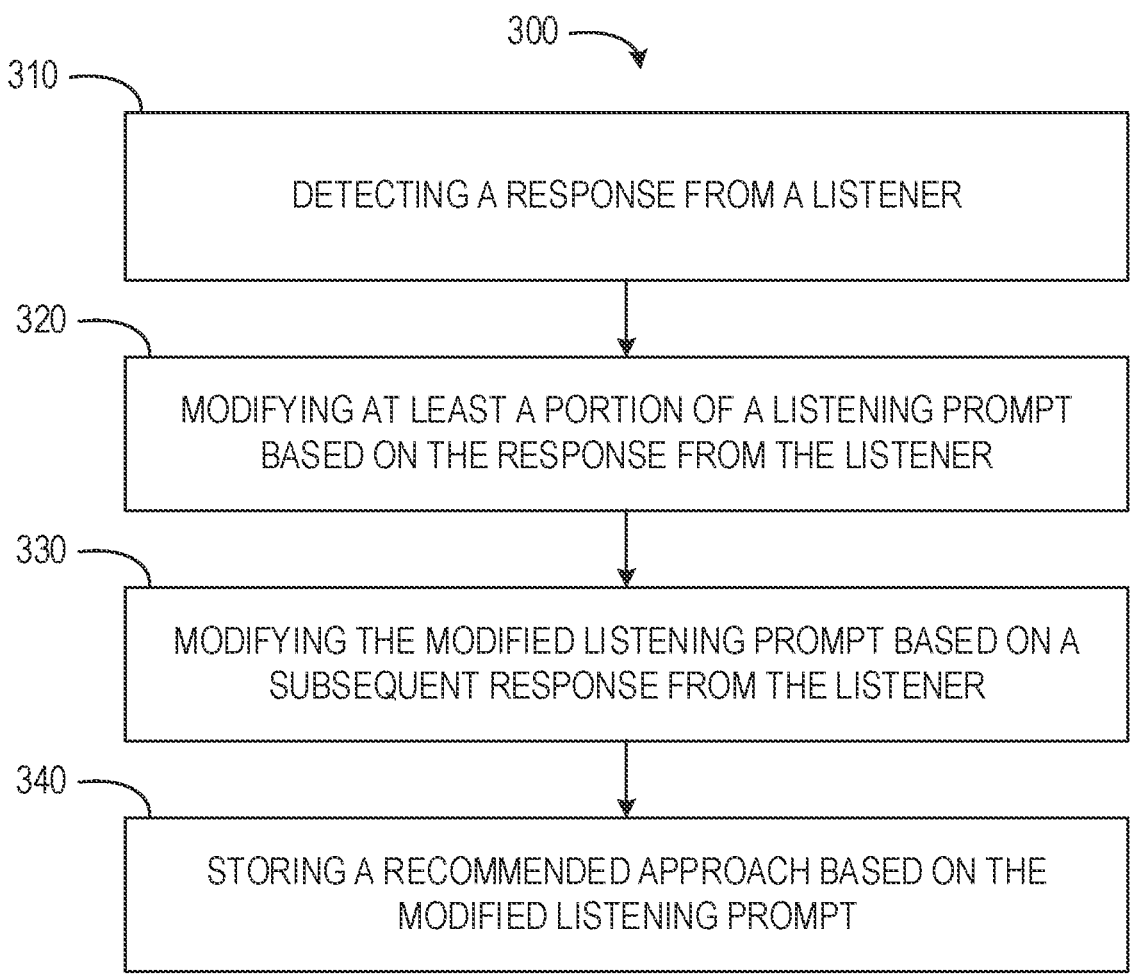
FIG. 3 depicts a flow diagram of a computer-implemented method for dynamic cue generation for language learning, according to at least one embodiment.

FIG. 3 shows a flow diagram of an embodiment of a computer-implemented method 300 for dynamic cue generation for language learning. The method 300 may be performed by or within the computing environment 100. In some embodiments, the method 300 comprises or incorporates one or more operations of the method 200. In some instances, operations of the method 300 may be incorporated as part of or sub-operations of the method 200.

In operation 310, the interaction component 110 detects a response from a listener. In some embodiments, the response is detected based on an audio stream presented to the listener at the audio stream level. The interaction component 110 may detect a response from a listener in a manner similar to or the same as described above with respect to operation 210. The response may be detected for a sentence or audio segment to which the listener previously reacted with listener actions. In some instances, the response is detected based on a listening prompt presented to the user in response to listener actions performed for a segment of an audio stream.

In operation 320, the prompt component 150 modifies at least a portion of the listening prompt based on the response from the listener. Modifying the portion of the listening prompt may generate a modified listening prompt. The prompt component 150 may modify the portion of the listening prompt in relation to a spoken accent, a standard pronunciation, a presentation speed, word changes, phrase changes, or any other suitable part, element, aspect, or characteristic of the listening prompt. In some embodiments, the prompt component 150 modifies the portion of the listening prompt by modifying one or more factor level (e.g., a language or characteristic level of words, accents, phrases, etc.) of a previously generated listening prompt.

In operation 330, the prompt component 150 modifies the modified listening prompt. The modified listening prompt may be modified based on a subsequent response from the listener. In some embodiments, the prompt component 150 modifies the listening prompt recursively. The listening prompt may be recursively modified repeatedly until a user understands a given section of the listening prompt or moves into the edge area of the language level. For example, the prompt component 150 may remove a keyword of a factor after providing a listening prompt with that keyword a specified number of times or upon successful acclimatization to the keyword (e.g., no additional listener actions trigger that factor or keyword).

In some embodiments, modifying the modified listening prompt generates a recommended approach for the listener. The recommended approach may be generated by recursively adjusting the listening prompt until the listener understands or suitably interacts with the listening prompt.

In operation 340, the prompt component 150 stores the recommended approach. The recommended approach may be saved within a language knowledge base. The language knowledge base may be tailored to individual users or to a user community. The language knowledge base may contain and continually recommended approaches for individual users or the user community to more effectively identify language levels of users, identify language understanding of users, and teach language to those users.

Figure 4:
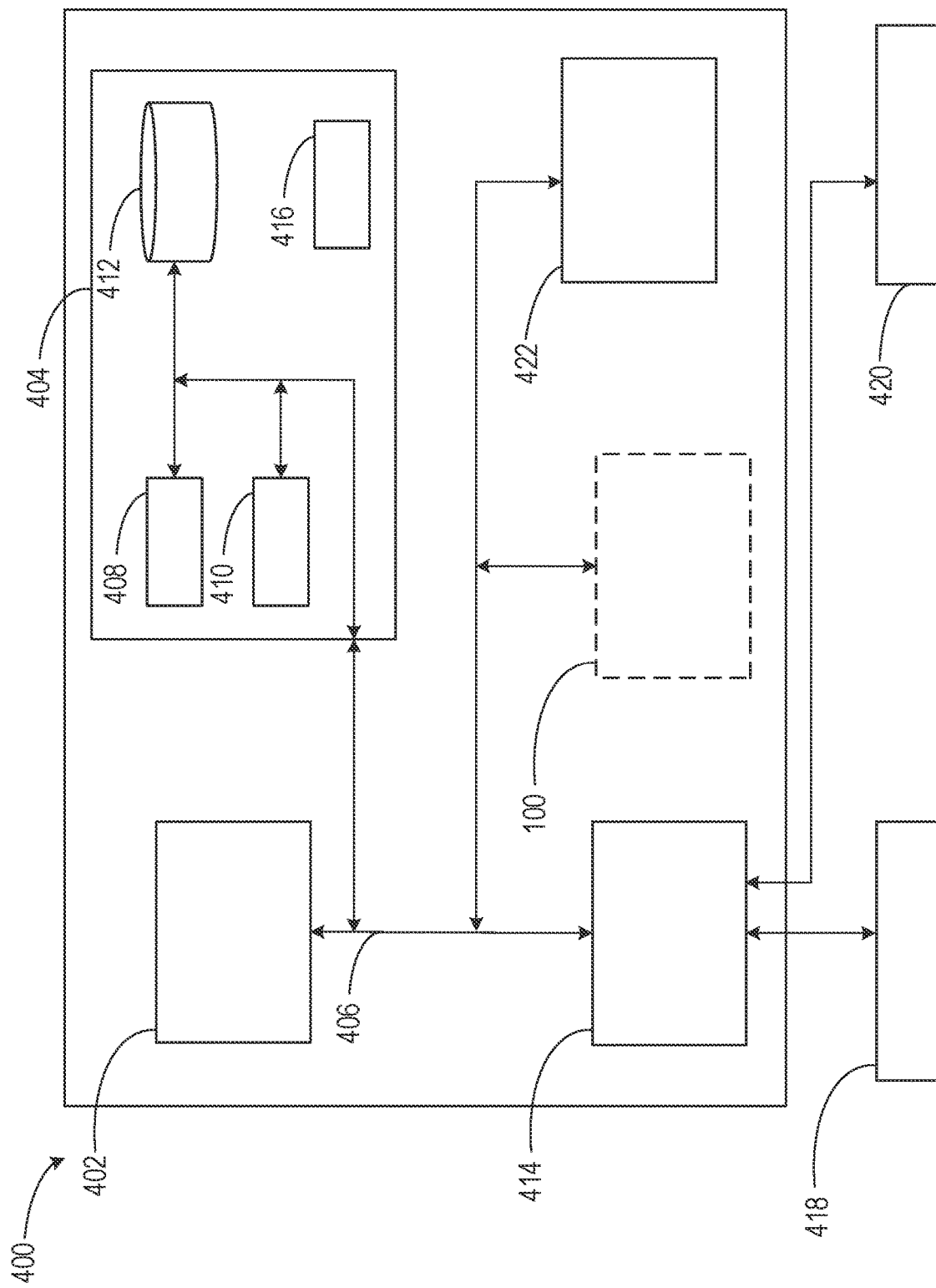
FIG. 4 depicts a block diagram of a computing system for dynamic cue generation for language learning, according to at least one embodiment.

Embodiments of the present disclosure may be implemented together with virtually any type of computer, regardless of the platform is suitable for storing and/or executing program code. FIG. 4 shows, as an example, a computing system 400 (e.g., cloud computing system) suitable for executing program code related to the methods disclosed herein and for dynamic cue generation for language learning.

The computing system 400 is only one example of a suitable computer system and is not intended to suggest any limitation as to the scope of use or functionality of embodiments of the present disclosure described herein, regardless, whether the computer system 400 is capable of being implemented and/or performing any of the functionality set forth hereinabove. In the computer system 400, there are components, which are operational with numerous other general purpose or special purpose computing system environments or configurations. Examples of well-known computing systems, environments, and/or configurations that may be suitable for use with computer system/server 400 include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like. Computer system/server 400 may be described in the general context of computer system-executable instructions, such as program modules, being executed by a computer system 400. Generally, program modules may include routines, programs, objects, components, logic, data structures, and so on that perform particular tasks or implement particular abstract data types. Computer system/server 400 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 400 is shown in the form of a general-purpose computing device. The components of computer system/server 400 may include, but are not limited to, one or more processors 402 (e.g., processing units), a system memory 404 (e.g., a computer-readable storage medium coupled to the one or more processors), and a bus 406 that couple various system components including system memory 404 to the processor 402. Bus 406 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 400 typically includes a variety of computer system readable media. Such media may be any available media that is accessible by computer system/server 400, and it includes both, volatile and non-volatile media, removable and non-removable media.

The system memory 404 may include computer system readable media in the form of volatile memory, such as random-access memory (RAM) 408 and/or cache memory 410. Computer system/server 400 may further include other removable/non-removable, volatile/non-volatile computer system storage media. By way of example only, a storage system 412 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 406 by one or more data media interfaces. As will be further depicted and described below, the system memory 404 may include at least one program product having a set (e.g., at least one) of program modules that are configured to carry out the functions of embodiments of the present disclosure.

The program/utility, having a set (at least one) of program modules 416, may be stored in the system memory 404 by way of example, and not limiting, as well as an operating system, one or more application programs, other program modules, and program data. Program modules may include one or more of the interaction component 110, the level component 120, the metric component 130, the stream component 140, and the prompt component 150, which are illustrated in FIG. 1. Each of the operating systems, one or more application programs, other program modules, and program data or some combination thereof, may include an implementation of a networking environment. Program modules 416 generally carry out the functions and/or methodologies of embodiments of the present disclosure, as described herein.

The computer system/server 400 may also communicate with one or more external devices 418 such as a keyboard, a pointing device, a display 420, etc.; one or more devices that enable a user to interact with computer system/server 400; and/or any devices (e.g., network card, modem, etc.) that enable computer system/server 400 to communicate with one or more other computing devices. Such communication can occur via Input/Output (I/O) interfaces 414. Still yet, computer system/server 400 may communicate with one or more networks such as a local area network (LAN), a general wide area network (WAN), and/or a public network (e.g., the Internet) via network adapter 422. As depicted, network adapter 422 may communicate with the other components of computer system/server 400 via bus 406. It should be understood that, although not shown, other hardware and/or software components could be used in conjunction with computer system/server 400. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Service models may include software as a service (SaaS), platform as a service (PaaS), and infrastructure as a service (IaaS). In SaaS, the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. In PaaS, the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. In IaaS, the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment models may include private cloud, community cloud, public cloud, and hybrid cloud. In private cloud, the cloud infrastructure is operated solely for an organization. It may be managed by the organization or a third party and may exist on-premises or off-premises. In community cloud, the cloud infrastructure is shared by several organizations and supports specific community that has shared concerns (e.g., mission, security requirements, policy, and compliance considerations). It may be managed by the organizations or a third party that may exist on-premises or off-premises. In public cloud, the cloud infrastructure is made available to the general public or a large industry group and is owned by an organization selling cloud services. In hybrid cloud, the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling modularity, and semantic interoperability. At the heart of cloud computing is an infrastructure that includes a network of interconnected nodes.

Figure 5:
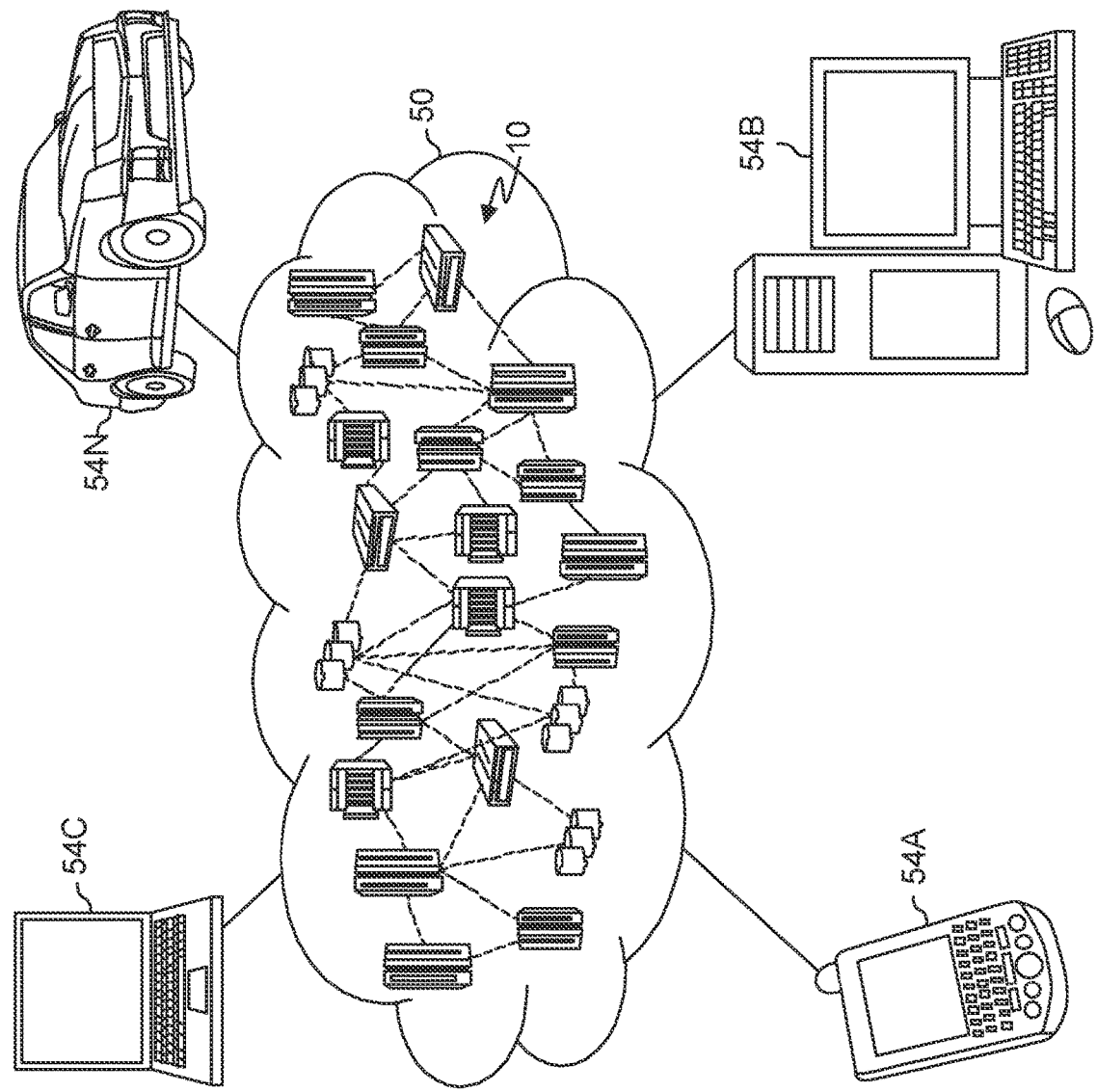
FIG. 5 is a schematic diagram of a cloud computing environment in which concepts of the present disclosure may be implemented, in accordance with an embodiment of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
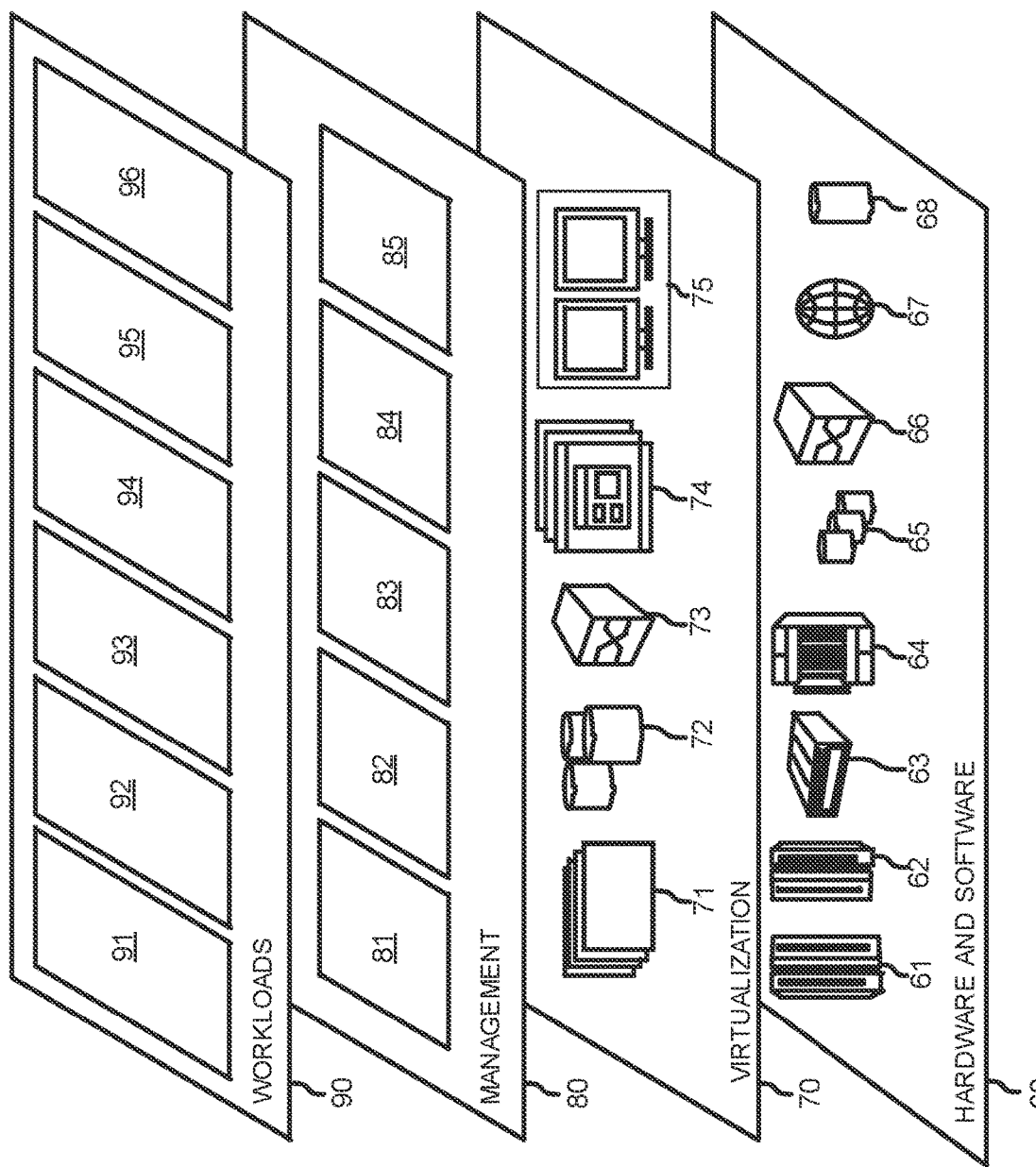
FIG. 6 is a diagram of model layers of a cloud computing environment in which concepts of the present disclosure may be implemented, in accordance with an embodiment of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cue generation processing 96.

Cloud models may include characteristics including on-demand self-service, broad network access, resource pooling, rapid elasticity, and measured service. In on-demand self-service a cloud consumer may unilaterally provision computing capabilities such as server time and network storage, as needed automatically without requiring human interaction with the service's provider. In broad network access, capabilities are available over a network and accessed through standard mechanisms that promote use by heterogeneous thin or thick client platforms (e.g., mobile phones, laptops, and PDAs). In resource pooling, the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). In rapid elasticity, capabilities can be rapidly and elastically provisioned, in some cases automatically, to quickly scale out and rapidly released to quickly scale in. To the consumer, the capabilities available for provisioning often appear to be unlimited and can be purchased in any quantity at any time. In measured service, cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

The descriptions of the various embodiments of the present disclosure have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer-readable storage medium (or media) having computer readable program instructions thereon for causing a processor to carry out aspects of the present invention.

The computer-readable storage medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer-readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the present disclosure in the form disclosed. Many modifications and variations will be apparent to those of ordinary skills in the art without departing from the scope of the present disclosure. The embodiments are chosen and described in order to explain the principles of the present disclosure and the practical application, and to enable others of ordinary skills in the art to understand the present disclosure for various embodiments with various modifications, as are suited to the particular use contemplated.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for dynamic cue generation for language learning, comprising:
    initiating an audio stream at a language level for a listener wherein the audio stream includes a first listening prompt;
    identifying, by an interaction monitoring device, one or more listener actions for the listener engaged in listening learning of a language, wherein the one or more listener actions are determined to be a listening event to indicate a lack of understanding for a portion of the language;
    based on the one or more listener actions, determining a language level of the listener;
    generating, by a prompt generator and based on machine learning, a set of prompt metrics based on the language level and the one or more listener actions, wherein the prompt metrics include metrics for at least one of an accent of the audio stream, a standard pronunciation, speed of speech of the audio stream, word changes, and phrase changes within the audio stream;
    ranking, by the prompt generator and based on machine learning, the set of prompt metrics;
    generating, by the prompt generator, a set of audio stream levels based on the set of prompt metrics;
    selecting an audio stream level for a second listening prompt, the audio stream level selected from the set of audio stream levels based on the language level of the listener;
    modifying the second listening prompt from the audio stream level to a second audio stream for the listener, wherein:
        the modifying is based on the set of prompt metrics;
        the modifying is configured to remove the lack of understanding; and
        the modifying modifies at least a first portion the listening prompt by modifying at least one factor based on the ranking of the set of prompt metrics; and
    executing program code for the steps of initiating, identifying, generating the set of prompt metrics, ranking, generating the set of audio stream levels, selecting, and modifying for dynamic cue generation for language learning.

2. The method of claim 1, wherein the determining of the language level of the listener further comprises:
    determining an edge area for the language level of the listener, wherein the edge area indicates aspects of the language for the listener to improve, and wherein the modifying moves the second audio stream into the edge area; and
    determining a listening level of the listener for the language level.

3. The method of claim 2, wherein the determining of the edge area further comprises:
    comparing one or more factors for the language level to one or more language characteristics of a listening learning segment associated with the one or more listener actions.

4. The method of claim 1, wherein the audio stream level is selected as a nearest audio stream level to the language level of the listener.

5. The method of claim 1, further comprising:
    detecting a response from the listener, the response detected based on an audio stream presented to the listener at the audio stream level.

6. The method of claim 5, further comprising:
    modifying at least a portion of the listening prompt based on the response from the listener.

7. The method of claim 6, further comprising:
    receiving a subsequent response from the listener;
    modifying the listening prompt based on the subsequent response to generate a recommended approach for the listener; and
    storing the recommended approach, wherein the recommended approach is configured to effectively teach language to a user.

8. A system for dynamic cue generation for language learning, comprising:
    one or more processors; and a computer-readable storage medium, coupled to the one or more processors, storing program instructions that, when executed by the one or more processors, cause the one or more processors to perform operations comprising:
- initiate an audio stream at a language level for a listener wherein the audio stream includes a first listening prompt;
- identifying, by an interaction monitoring device, one or more listener actions for the listener engaged in listening learning;
- based on the one or more listener actions, determining a language level of the listener of a language, wherein the one or more listener actions are determined to be a listening event that indicates a lack of understanding for a portion of the language;
- generating, by a prompt generator and based on machine learning, a set of prompt metrics based on the language level and the one or more listener actions, wherein the prompt metrics include metrics for at least one of an accent of the audio stream, a standard pronunciation, speed of speech of the audio stream, word changes, and phrase changes within the audio stream;
- generating, by the prompt generator, a set of audio stream levels based on the set of prompt metrics;
- ranking, by the prompt generator and based on machine learning, the set of prompt metrics;
- selecting an audio stream level for a second listening prompt, the audio stream level selected from the set of audio stream levels based on the language level of the listener;
- modifying the second listening prompt from the audio stream level to a second audio stream for the listener, wherein:
  - the modifying is based on the set of prompt metrics;
  - the modifying is configured to remove the lack of understanding; and the modifying modifies at least a first portion the listening prompt by modifying at least one factor based on the ranking of the set of prompt metrics; and
  - executing program code for the steps of initiating, identifying, generating the set of prompt metrics, ranking, generating the set of audio stream levels, selecting, and modifying for dynamic cue generation for language learning.

9. The system of claim 8, wherein the determining of the language level of the listener further comprises:
- determining an edge area for the language level of the listener, wherein the edge area indicates aspects of the language for the listener to improve and wherein the modifying moves the second audio stream into the edge area; and
- determining a listening level of the listener for the language level.

10. The system of claim 9, wherein determining the edge area further comprises:
- comparing one or more factors for the language level to one or more language characteristics of a listening learning segment associated with the one or more listener actions.

11. The system of claim 8, wherein the audio stream level is selected as a nearest audio stream level to the language level of the listener.

12. The system of claim 8, wherein the operations further comprise:
- detecting a response from the listener, the response detected based on an audio stream presented to the listener at the audio stream level.

13. The system of claim 12, wherein the operations further comprise:
- modifying at least a portion of the listening prompt based on the response from the listener.

14. The system of claim 13, wherein the operations further comprise:
- receiving a subsequent response from the listener;
- modifying the listening prompt based on the subsequent response to generate a recommended approach for the listener; and
- storing the recommended approach, wherein the recommended approach is configured to effectively teach language to a user.

15. A computer program product comprising a computer readable storage medium having program instructions embodied therewith, the program instructions being executable by one or more processors to cause the one or more processors to perform operations for dynamic cue generation for language learning comprising:
- initiate an audio stream at a language level for a listener;
- identifying, by an interaction monitoring device, one or more listener actions for the listener engaged in listening learning of a language, wherein the one or more listener actions are determined to be a listening event that indicates a lack of understanding for a portion of the language;
- based on the one or more listener actions, determining a language level of the listener;
- generating, by a prompt generator and based on machine learning, a set of prompt metrics based on the language level and the one or more listener actions, wherein the prompt metrics include metrics for at least one of an accent of the audio stream, a standard pronunciation, speed of speech of the audio stream, word changes, and phrase changes within the audio stream;
- ranking, by the prompt generator and based on machine learning, the set of prompt metrics;
- generating, by the prompt generator, a set of audio stream levels based on the set of prompt metrics;
- selecting an audio stream level for a second listening prompt, the audio stream level selected from the set of audio stream levels based on the language level of the listener;
- modifying the listening prompt from the audio stream to a second audio stream for the listener, wherein:
  - the modifying is based on the set of prompt metrics;
  - the modifying is configured to remove the lack of understanding; and the modifying modifies at least a first portion the listening prompt by modifying at least one factor based on the ranking of the set of prompt metrics; and
- executing program code for the steps of initiating, identifying, generating the set of prompt metrics, ranking, generating the set of audio stream levels, selecting, and modifying for dynamic cue generation for language learning.

16. The computer program product of claim 15, wherein the determining of the language level of the listener further comprises:
- determining an edge area for the language level of the listener, wherein the edge area indicates aspects of the language for the listener to improve, and wherein the modifying moves the second audio stream into the edge area; and determining a listening level of the listener for the language level.

17. The computer program product of claim 16, wherein determining the edge area further comprises:
   comparing one or more factors for the language level to one or more language characteristics of a listening learning segment associated with the one or more listener actions.

18. The computer program product of claim 15, wherein the operations further comprise:
   detecting a response from the listener, the response detected based on an audio stream presented to the listener at the audio stream level; and
   modifying at least a portion of the listening prompt based on the response from the listener.

19. The computer program product of claim 18, wherein the operations further comprise:
   receiving a subsequent response from the listener;
   modifying the listening prompt based on the subsequent response to generate a recommended approach for the listener; and
   storing the recommended approach, wherein the recommended approach is configured to effectively teach language to a user.

20. The method of claim 1, further comprising:
   repeatedly modifying the second audio stream until the interaction monitoring device determines no misunderstanding of the second listening prompt.

* * * * *